United States Patent

[11] 3,628,760

| [72] | Inventors | Robert D. Kindorf<br>448 Scenic Ave., Piedmont;<br>David O. Kindorf, 6257 Girvin Drive,<br>Oakland, both of Calif. 94611 |
|---|---|---|
| [21] | Appl. No. | 2,129 |
| [22] | Filed | Jan. 12, 1970 |
| [45] | Patented | Dec. 21, 1971 |

[54] HANGER FOR SUPPORTING INSULATED PIPE
7 Claims, 5 Drawing Figs.

[52] U.S. Cl. .............................................. 248/59,
248/62, 248/327
[51] Int. Cl. .................................................. F1613/18
[50] Field of Search .......................... 248/59, 58,
62, 327

[56] References Cited
UNITED STATES PATENTS

| 649,270 | 5/1900 | Collins | 248/62 X |
|---|---|---|---|
| 709,815 | 9/1902 | Collins | 248/62 |
| 2,835,464 | 5/1958 | Kolodin | 248/62 |
| 3,167,286 | 1/1965 | Sherburne | 248/62 |

*Primary Examiner*—Chancellor E. Harris
*Attorney*—Fryer, Tjensvold, Feix, Phillips & Lempio ABSTRACT: A hanger for insulated pipe with a device for temporarily holding the pipe at its proper elevation and grade prior to the application of insulation and used in conjunction with a special connection between the hanger and a hanger rod by which it is suspended, which connection enables the hanger rod to swing upon expansion of the pipe with the hanger remaining in its normal vertical position without damaging the insulation.

PATENTED DEC 21 1971 3,628,760
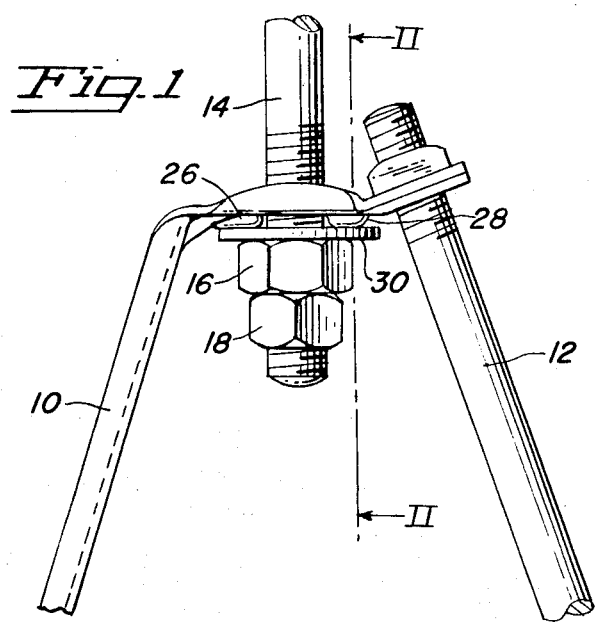
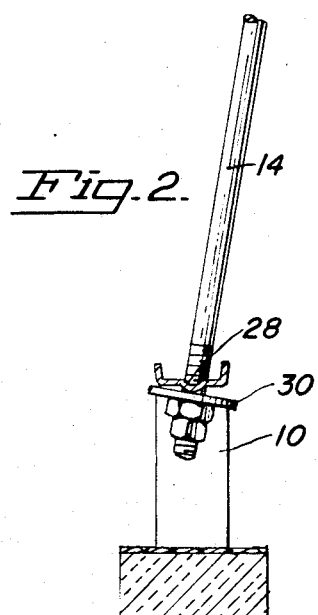
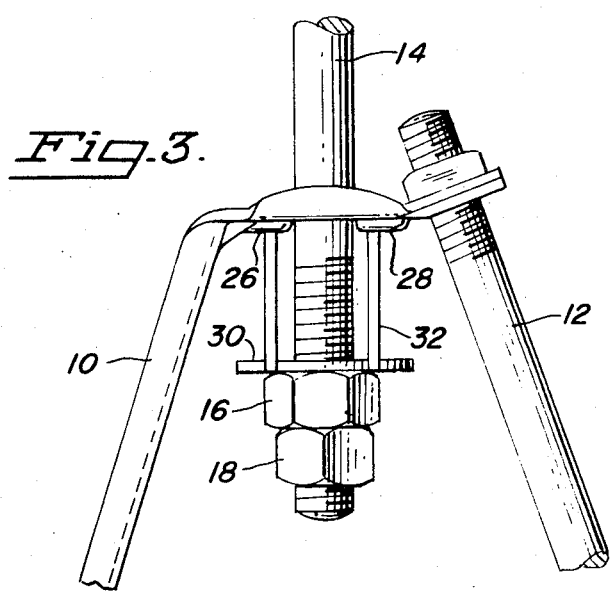
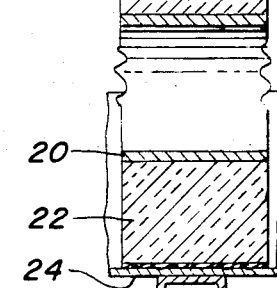
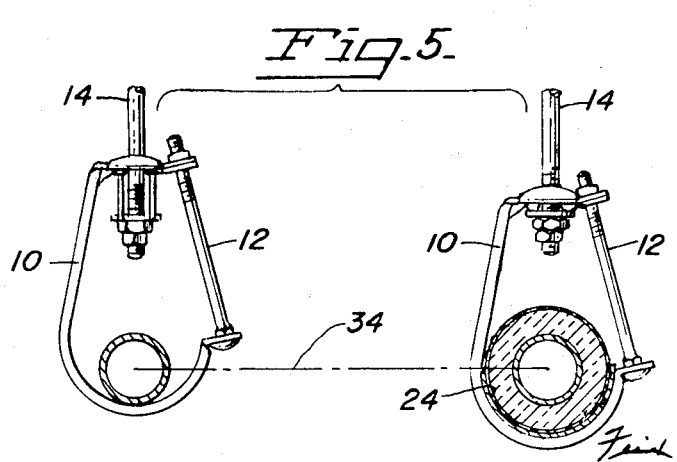
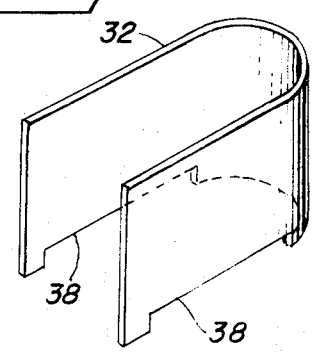
INVENTORS
ROBERT D. KINDORF
DAVID O. KINDORF
BY *Fryer Tjensvold*
*Fred Phillips + Lung* ATTORNEYS

HANGER FOR SUPPORTING INSULATED PIPE

As set forth in the U.S. Pat. No. 3,415,474 to Orlan C. Kindorf, it is customary to hang pipe which is to be insulated at its proper intended elevation and grade with some temporary support means which compensates for the thickness of insulation to be applied at a later time. Said patent discloses a clevis type hanger with means for temporary support of the pipe for the purpose referred to above. In clevis-type hangers, there is freedom of movement between the clevis and a pipe supporting strap suspended therefrom so that the expansion of the pipe which swings the clevis and its supporting rod away from the vertical position permits the strap to remain vertical and prevents it from cutting into the insulation.

In C-type pipe hangers, there is no such freedom of movement between the hanger rod and the pipe supporting portion of the hanger. This is particularly undesirable when the hanger is provided with a curved plate or cradle intended to protect the insulation as disclosed in our copending application entitled "Insulation Protector for Pipe Hangers" Ser. No. 2,128, filed Jan. 12, 1970.

The present invention provides a C-type pipe hanger which, through simple and inexpensive structure, enables swinging of the hanger rod with the hanger remaining vertical and also enables the use of a very simple and inexpensive device to compensate for insulation thickness during the time between hanging of the pipe and installation of the insulation. The invention is described in greater detail in the following specification wherein reference is made to the accompanying drawing.

In the drawing:

FIG. 1 is a view of the upper portion of a C-type pipe hanger and the lower portion of a hanger rod from which it is suspended;

FIG. 2 is a sectional view through the entire hanger taken on the line II—II of FIG. 1;

FIG. 3 is a view like FIG. 1 illustrating the use of the invention for supporting pipe before insulation is applied;

FIG. 4 is a perspective view showing the device employed in FIG. 3; and

FIG. 5 is a view showing two hangers of the present invention, one employing the device in FIG. 4 to compensate for insulation that has not been applied, and the other showing the pipe with the insulation applied and illustrating the manner in which the elevation of the pipe remains the same in both cases.

The pipe hanger of the present invention is of the so-called C-type having a C-shaped body portion 10 with its upper and lower ends connected as by a bolt 12, the full hanger being best illustrated in FIG. 5. The hanger is supported on a rod 14 which depends from the ceiling or other overhead structure. A nut 16 and a lock nut 18 are both threaded on the rod below the portion of the hanger through which the rod extends. This is contrary to conventional practice where one nut is placed above and the other below the hanger. In the present case, it is intended that the hanger be capable of vertical movement with respect to the rod during assembly of the pipe and insulation into the supported position.

FIG. 2 illustrates the position assumed by the pipe at 20 and insulation at 22 after final assembly. FIG. 2 also illustrates the hanger as having been moved toward the left which motion is permitted by the hanger rod which may either swing or bend away from its normal vertical position. It is most desirable that the hanger itself retain the vertical position during this movement so that the edge of the hanger or the ends of an insulation protector shown at 24 in FIGS. 2 and 5 do not dent or crush the insulation.

In accordance with the present invention, the hanger is enabled to retain its vertical position by a pair of aligned ridges best shown at 26 and 28 in the upper portion of the hanger disposed on opposite sides of a perforation through which the rod extends. A washer 30 disposed above the nuts on the rod underlies the ridges 26 and 28 and the ridges form a line-type bearing enabling pivotal movement between the rod and the hanger which is illustrated in FIG. 2 as permitting the hanger to assume a vertical position although the rod has swung throughout a considerable angle toward the left.

The same washer 30 serves a second function in connection with the spacer shown at 32 in FIG. 4 and also shown in FIG. 3. This spacer is used between the installation of the pipe and the installation of the insulating material and assumes the position illustrated in FIG. 3 and also in the left-hand part of FIG. 5 where it acts as a spacer which is equal to the thickness of the insulation and therefore holds the installed pipe on the same horizontal centerline shown at 34 in FIG. 5 as that of the pipe at the right-hand part of FIG. 5 where the insulation has been installed and the spacer removed.

As shown in FIG. 4, the spacer 32 is of U-shape configuration so that it may be placed between the washer 30 and the upper portion of the hanger as illustrated in FIG. 3 during the installation and adjustment of the hanger to support the pipe in a level horizontal position or in a slightly graded position as the particularly installation may require. On edge of the spacer 32, which is shown as the lower edge in FIG. 4 has opposed notches 38 provided to bridge the washer 30; thus, retaining the spacer against accidental displacement. It may of course be readily removed by very slightly elevating the hanger with respect to the rod and washer. The spacer may be inverted if desired so that the notches 38 embrace the upper part of the hanger rather than the washer 30 where they will serve the same purpose in preventing accidental dislodgement of the spacer.

What is claimed is:

1. A pipe hanger which has a generally horizontally disposed portion perforated for reception of a hanger rod and adjustable means on the rod providing a flat surface upon which said portion rests, a line bearing area between the horizontal portion and the adjustable means enabling the hanger to rock with respect to the rod and remain vertical when the rod swings, the line bearing area being formed by an elongated deformation on the horizontal portion of the hanger, the elongated deformation being perpendicular to the pipe supported by the hanger.

2. The hanger of claim 1 in which the adjustable means includes at least one nut threaded on the hanger rod, and a washer forming said flat surface 3. A pipe hanger which has a generally horizontally disposed portion perforated for reception of a hanger rod and adjustable means on the rod upon which said portion rests, a line bearing area between the horizontal portion and and the adjustable means to enable the hanger to rock with respect to the rod and remain vertical when the rod swings, the line bearing area being formed by deformation of the horizontal portion of the hanger, the adjustable means including at least one nut threaded on the hanger rod, and a washer between the nut and the bearing area with spacer means insertable temporarily between the washer and horizontal portion to raise the hanger a distance equal to the thickness of insulation to be installed on a pipe after it is supported by the hanger.

4. The hanger of claim 4 in which the spacer is a U-shaped member capable of being positioned to embrace the rod after pipe is installed and adjusted to a desired elevation.

5. The hanger of claim 4 in which the spacer means is shaped to prevent dislodgement from its operable position without raising the hanger with respect to the rod.

6. The hanger of claim 5 in which the means to prevent dislodgement consists of an irregular configuration in at least one edge of the U-shaped member to prevent sliding movement in a dislodging direction.

7. A pipe hanger which has a generally horizontally disposed portion perforated for reception of a hanger rod and adjustable means on the rod including a washer upon which said portion rests, a line bearing area between the horizontal portion and the adjustable means enabling the hanger to rock with respect to the rod and remain vertical when the rod swings, the line bearing area being formed by an elongated deformation on one of the horizontally disposed hanger portions and the washer, the elongated deformation being perpendicular to the pipe, supported by the hanger.

* * * * *

UNITED STATES PATENT OFFICE
CERTIFICATE OF CORRECTION

Patent No. 3,628,760           Dated December 21, 1971

Inventor(s) Robert D. Kindorf and David O. Kindorf

It is certified that error appears in the above-identified patent and that said Letters Patent are hereby corrected as shown below:

<u>Column 2, Line 17</u>

"On" should be deleted and --One-- inserted.

<u>Column 2, Line 44</u>

Delete one of the words "and".

<u>Column 2, Line 54</u>

"4" should be deleted and --3-- inserted.

Signed and sealed this 22nd day of August 1972.

(SEAL)
Attest:

EDWARD M. FLETCHER, JR.
Attesting Officer

ROBERT GOTTSCHALK
Commissioner of Patents